US012764229B2

(12) United States Patent
Yannam et al.

(10) Patent No.: US 12,764,229 B2
(45) Date of Patent: Oct. 13, 2026

(54) CHATBOT DEFLECTION

(71) Applicant: Bank of America Corporation, Charlotte, NC (US)

(72) Inventors: Ramakrishna R. Yannam, The Colony, TX (US); Prejish Thomas, Plano, TX (US); Ion Gerald McCusker, Allen, TX (US); Emad Noorizadeh, Plano, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 742 days.

(21) Appl. No.: 18/074,674

(22) Filed: Dec. 5, 2022

(65) Prior Publication Data

US 2024/0187522 A1 Jun. 6, 2024

(51) Int. Cl.
*H04M 3/51* (2006.01)

(52) U.S. Cl.
CPC ....... *H04M 3/5133* (2013.01); *H04M 3/5166* (2013.01)

(58) Field of Classification Search
CPC .......................... H04M 3/5133; H04M 3/5166
See application file for complete search history.

(56) References Cited

U.S. PATENT DOCUMENTS

| | | | | |
|---|---|---|---|---|
| 9,165,057 | B1 * | 10/2015 | Bostian | G06F 16/90324 |
| 10,963,525 | B2 * | 3/2021 | Nishant | G06N 3/006 |
| 11,057,522 | B2 * | 7/2021 | Lee | H04M 3/4933 |
| 11,064,074 | B2 * | 7/2021 | Erhart | G06N 3/08 |
| 11,418,648 | B2 * | 8/2022 | Erhart | H04L 51/046 |
| 11,843,717 | B2 * | 12/2023 | Chavez | H04M 3/5191 |
| 11,893,904 | B2 * | 2/2024 | Stoops | G09B 5/04 |
| 2003/0120593 | A1 * | 6/2003 | Bansal | H04L 67/02 705/36 R |
| 2003/0185379 | A1 * | 10/2003 | O'Connor | H04L 51/56 379/265.02 |
| 2012/0076283 | A1 * | 3/2012 | Ajmera | H04M 3/5183 379/93.17 |
| 2018/0189273 | A1 * | 7/2018 | Campos | H04L 51/02 |
| 2020/0128053 | A1 * | 4/2020 | Rosanuru | G06Q 20/407 |
| 2023/0040119 | A1 * | 2/2023 | Friio | H04L 51/04 |
| 2025/0158942 | A1 * | 5/2025 | Rodgers | G06F 40/20 |
| 2025/0337701 | A1 * | 10/2025 | Du | H04L 51/02 |
| 2026/0067401 | A1 * | 3/2026 | Afzal | H04M 3/5141 |
| 2026/0195560 | A1 * | 7/2026 | Bhattacharya | G06N 3/006 |

* cited by examiner

*Primary Examiner* — Lisa Hashem
(74) *Attorney, Agent, or Firm* — Weiss & Arons LLP

(57) ABSTRACT

Apparatus and methods for a chatbot deflection program are provided. A chatbot may receive an input it is unable to answer or parse. The chatbot may transfer the chat to an agent for a response. The chatbot may provide a search field for the agent. The agent may review the input and query the chatbot. The chatbot may provide an answer. The agent may provide a response to the input, using the answer. The response may be transmitted to the user. The chat may be transferred back to the chatbot.

20 Claims, 6 Drawing Sheets

CHATBOT DEFLECTION

FIELD OF TECHNOLOGY

Aspects of the disclosure relate to automatically deflecting chats and texts from a chatbot to a human agent and back to the chatbot.

BACKGROUND OF THE DISCLOSURE

Customers and other individuals may interact with a chatbot run by an entity for various reasons. Chatbots may be textual or audiovisual. Chatbots may include artificial intelligence/machine learning, natural language processing, and other code. Chatbots may provide numerous advantages to the entity, including saving time of customer service representatives.

Often, a user may present a query or statement to a chatbot that the chatbot may not understand. The chatbot may ask for clarification. When the chatbot cannot parse or understand the query or statement, the user may become frustrated. In addition, the chatbot may be required to transfer the chat to a customer service representative, increasing the time spent by the customer service representative.

It may be advantageous to deflect the chat to an agent solely to answer the query or statement, and then returning the chat to the chatbot, saving time of the agent.

Currently, there is no apparatus or method available to automatically determine when to transfer a chat to a customer service agent, provide tools to the agent to respond, respond to the user, and then seamlessly transfer the chat back to the chatbot.

Therefore, it would be desirable for apparatus and methods to automatically determine when to transfer a chat to a customer service agent, provide tools to the agent to respond, provide the response to the user, and then seamlessly transfer the chat back to the chatbot, with or without knowledge of the user.

SUMMARY OF THE DISCLOSURE

It is an object of this disclosure to provide apparatus and methods to automatically deflect calls and texts from a chatbot to a human agent and back to the chatbot.

An automatic chatbot deflection computer program product is provided. The computer program product may include executable instructions. The executable instructions may be stored on non-transitory memory. The executable instructions may be executed by a processor on a computer system.

The program (i.e., the executable instructions) may receive an input from a user within a chat with a chatbot. The input may be textual or audiovisual.

The program may determine, through one or more artificial intelligence/machine learning ("AI/ML") algorithms, that the input should be forwarded to an agent to provide an answer, as the chatbot is unable to answer the input to a required degree of confidence.

The program may transfer the chat to a display proximate to the agent. The program may display the input to the agent. The program may provide a separate search display/field to the agent. The program may receive a search request from the agent, which the agent may have input within the search display/field. The search request may relate to the input from the user. The program may determine an answer to the search request. The program may provide, to the agent, the answer to the search request.

The program may receive a response from the agent to the input of the user. The program may transmit the response to the user and transfer the chat back to the chatbot.

The determination that the chatbot is unable to answer the input may analyze, inter alia: the input, past history of the chat, and context of the input.

In an embodiment, the answer to the agent's search request may be in computer-readable code.

In an embodiment, the agent's response to the user's input may include the agent copying and pasting the answer to the search request.

In an embodiment, the agent's response to the user's input may include the agent copying and pasting the computer-readable code, and the computer-readable code may be translated to plain-text before being transmitted to the user.

In various embodiments, the chat may be text-based or voice-based (i.e., audiovisual-based).

In an embodiment, the program may transfer the past history of the user interacting with the chatbot to the display so that the agent may view the past history.

In an embodiment, the program may transfer the past history of the chat to the display so that the agent may view part or all of the chat.

In an embodiment, the program may execute an action after the agent pastes the computer-readable code into a dialogue box/field. The action may include transferring the chat back to the chatbot. For example, the agent may review the input, formulate a search request and the program may return an answer in computer-readable code. The agent may copy and paste the code into a dialogue box and press 'enter.' When that is complete, the code may execute and perform an action, such as automatically transferring the chat back to the chatbot with additional information so that the chatbot may answer the input. For example, the search request may simply re-frame the input in a manner so that the chatbot can understand, i.e., the agent may act as a translator between the chatbot and the user.

In an embodiment, the action may include converting the computer-readable code into a format accessible to the user, such as text, a hyperlink, an audiovisual message, or other accessible format.

In an embodiment, the answer provided by the program to the agent's search request may be determined by the contents of the search request and the past history of the chat.

In an embodiment, the input, search request, answer, and response may be stored by the program, in a database or other non-transitory memory. The input, search request, answer, and response may also be analyzed, through one or more algorithms (AI/ML or other) to train the chatbot for one or more future inputs.

An apparatus for automatic chatbot deflection is provided. The apparatus may include a central server and an agent device near an agent (such as a personal computing device).

The central server may include a server communication link, a server processor, and a server non-transitory memory. The server memory may be configured to store at least: a server operating system, and a chatbot. The chatbot may include an automatic chatbot deflection module.

The agent device may include a device communication link, a device processor, a device graphical user interface, and a device non-transitory memory. The device memory may be configured to store at least: a device operating system, and an interface in electronic communication over the device communication link with the chatbot.

The automatic chatbot deflection module may receive an input from a user within a chat with the chatbot. The module may determine, through an artificial intelligence/machine learning algorithm that the input should be forwarded to the agent to provide an answer, as the chatbot may be unable to provide an answer. The module may transfer the chat to the device graphical user interface, display the input to the agent, provide a separate search field to the agent. The module may receive a search request from the agent within the search field, determine an answer to the search request, and provide, to the agent, the answer to the search request. The module may receive a response within a text field, from the agent to the input, transmit the response to the user, and transfer the chat back to the chatbot.

In an embodiment, the apparatus, when determining whether to transfer the chat to the agent, the chatbot deflection module may analyze, at least, the past history of the user, past history of the chat, the input, and the context of the input.

In an embodiment, all or part of the chatbot deflection module may be graphically displayed on the interface.

In an embodiment, the chatbot deflection module may store the input, search request, answer, and response in a database (non-transitory memory) at the central server.

A method for automatically deflecting a chatbot to an agent is provided. The method may include the step of receiving an input from a user within a chat with a chatbot located at a central server. The method may include the step of determining, at a chatbot deflection module located at the central server, through an artificial intelligence/machine learning algorithm, that the input should be forwarded to the agent to provide an answer to the input, as the chatbot may be unable to answer the input satisfactorily.

The method may include the step of transferring the chat to a device graphical user interface ("dGUI") near the agent. The dGUI may include at least three distinct fields: a chat history field, a search field, and a text response field.

The method may include the steps of displaying the input to the agent in the chat history field, displaying a chat history to the agent in the chat history field, and receiving a search request from the agent within the search field.

The method may include the steps of determining, at the chat deflection module, an answer to the search request, and providing, to the agent, the answer to the search request in the search field.

The method may include the steps of receiving a response within the text response field, from the agent, to the input, transmitting the response to the user, and transferring the chat back to the chatbot.

In an embodiment, the method may include the step of storing, in a database at the central server, the input, the chat history, the search request, the answer, the response, metadata, and other information. The method may include the step of training the chatbot with data stored in the database.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
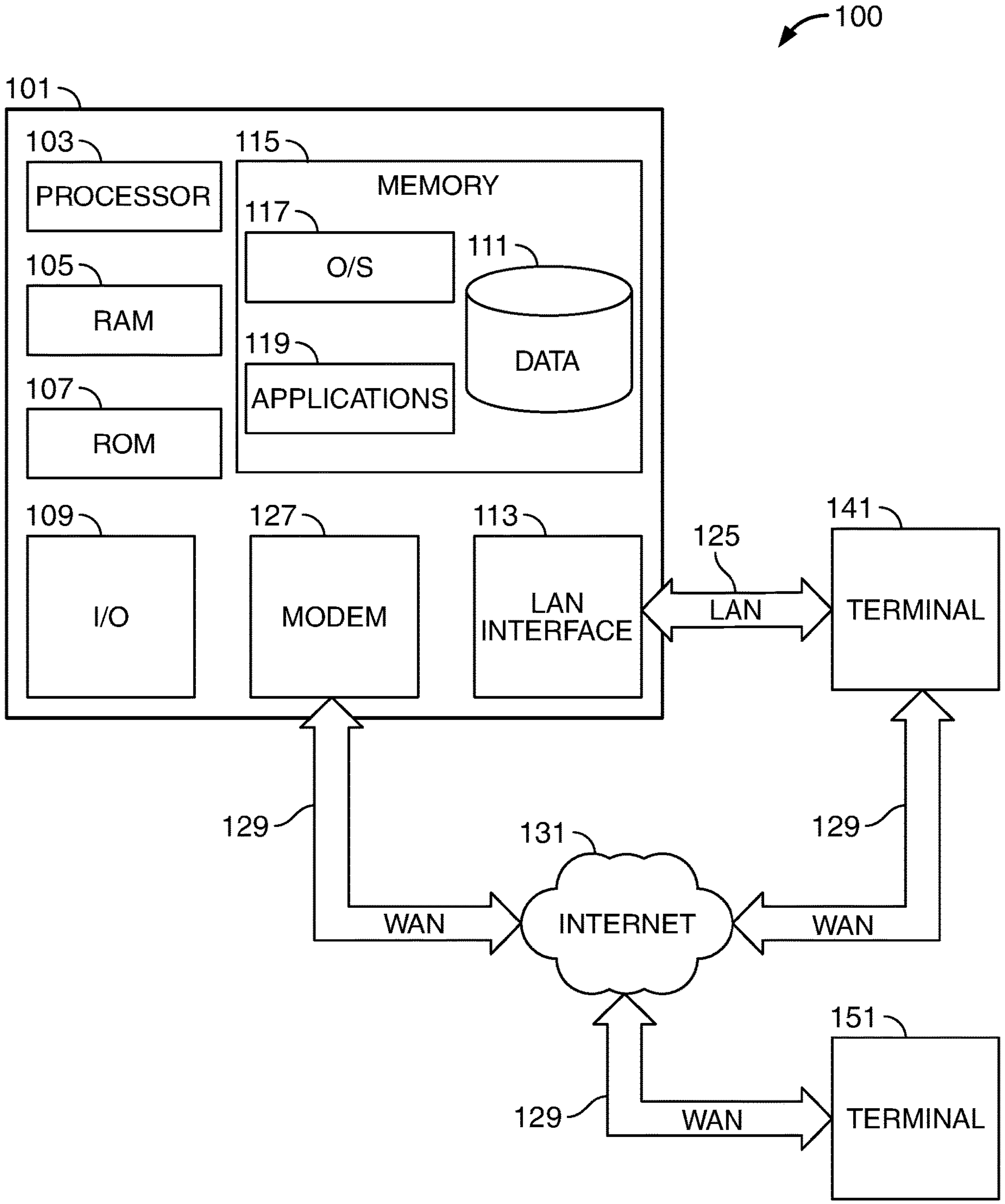
FIG. 1 shows an illustrative apparatus in accordance with principles of the disclosure.

It is an object of this disclosure to provide apparatus and methods to automatically deflect interactions with a chatbot from the chatbot to an agent and back to the chatbot.

An automatic chatbot deflection computer program product is provided. The computer program product may include executable instructions. The executable instructions may be stored on non-transitory memory.

The executable instructions may be executed by a processor on a computer system. Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include a communication link, a processor or processors, and a non-transitory memory configured to store executable data configured to run on the processor, among other components. The executable data may include an operating system and the automatic chatbot deflection computer program.

A processor (s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with other computers as well as any server or servers. The communication link may include any necessary hardware (e.g., antennae) and software to control the link. Any appropriate communication link may be used. In an embodiment, the network used may be the Internet. In another embodiment, the network may be an internal intranet.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program (i.e., the executable instructions) may receive an input from a user within a chat with a chatbot. The input may be textual or audiovisual. The input may be a question or a request. The question or request may be for an action or information. The input may be at the beginning, middle, or end of a chat session. The chat may be textual or audiovisual. The chat may be in any language. The chatbot may be operated by an entity. In an embodiment, the chat may be initiated by the chatbot on behalf of the entity.

The chat may be on a website, through a mobile device such as a smartphone, or through any other appropriate computing device.

The program may determine, through one or more artificial intelligence/machine learning ("AI/ML") algorithms that the input should be forwarded to an agent to provide an answer, as the chatbot is unable to answer the input to a required, threshold, degree of confidence.

Any appropriate AI/ML algorithm or combination of algorithms may be used. For example, the program may determine that the input should be transferred to an agent because the chatbot is unable to parse or translate the input to a predetermined threshold of accuracy (such as 50%, or 75%, meaning that the chatbot is 50% certain that the input means X).

In an embodiment, the input may be a request to speak/chat to a customer service agent. The program may honor this request and transfer the chat to an agent.

The agent may be a human customer service agent. In an embodiment, the agent may be a more powerful and capable chatbot.

The program may transfer part or all of the chat to a display near the agent. The agent may be in front of a personal computer, tablet, smartphone, smart TV, or other computer with a display screen. The program may transfer control of the chat to the agent so that the agent may respond to the user.

The program may display the input to the agent, in a particular area/field of the display. The agent may be able to manipulate the display or chat, such as scrolling up or down to view older or newer portions of the chat.

The program may provide a separate search display/field to the agent. The agent may search a database or other repository of information. The database may be internal to the entity.

The program may receive a search request from the agent, which the agent may have input within the search display/field. The search request may relate to the input from the user. The search request may be null. The search request may be a translation of the user input to a format or wording the chatbot may understand. For example, if the user input is "show me the account," the program may determine that it cannot answer as the user may have multiple accounts. The agent may view the user input as well as chat history or user history and determine the user is requesting details on a savings account, or checking account, etc. The agent may then type or input "the user is requesting information regarding savings account no. XXXYYYZZZ." This agent request may be understandable by the chatbot.

The program may determine an answer to the search request. The answer may be to transfer control of the chat back to the program or chatbot once it knows what the user input means because of the agent's search request. The program may provide, to the agent, the answer to the search request.

The program may receive a response from the agent to the input of the user. The response may be based on the answer to the search request. The response may be formulated without any search request. The response may be a translation of the user input.

The program may transmit the response to the user and/or transfer the chat back to the chatbot to provide the response.

In order to make the determination that the chatbot is unable to answer the input, the AI/ML algorithm (s) may analyze, inter alia: the input, past history of the chat, and context of the input. For example, the AI/ML algorithm (s) may analyze the chat in its entirety, any statements preceding the user input, past history of the user, as well as any other available information. If the program or chatbot can understand and respond to the user input to a pre-determined level of accuracy, the chatbot may respond. When the program or chatbot cannot understand the user input to a pre-determined level of accuracy, the chat may be deflected to an agent as described in this disclosure.

In an embodiment, the answer to the agent's search request may be in computer-readable code. For example, the answer may be a hyperlink, a code, a QR code, or other machine language that may be meaningless to a person. The computer-readable code may initiate an action when it is transferred to a particular field or clicked or otherwise interacted with.

In an embodiment, the agent's response to the user's input may include the agent copying and pasting the answer to the search request. For example, if the agent determines that the user is requesting information on a particular account, the agent may request that information in the search field, the information may be displayed as the answer to the request, and the agent may provide that information to the user as a response to the user.

In an embodiment, the agent's response to the user's input may include the agent copying and pasting the computer-readable code into a response field on the agent's display. The computer-readable code may be translated to plain-text before being transmitted to the user. The computer-readable code may initiate an action when activated. The action may be to provide a clickable link to the user. The action may be to transfer the chat back to the chatbot (now that the chatbot may understand the user's input).

In an embodiment, the program may transfer the past history of the user interacting with the chatbot to the display so that the agent may view the past history. The past history may be of the chat and/or of the user's past history with the entity. The agent may be able to manipulate the history to view different portions of the history.

In an embodiment, the program may transfer the past history of the chat to the display so that the agent may view part or all of the chat. The agent may be able to manipulate the history to view different portions of the history.

In an embodiment, the program may execute an action after the agent pastes the computer-readable code into a dialogue box/field, executing the computer-readable code. The action may include transferring the chat back to the chatbot. For example, the agent may review the input, formulate a search request and the program may return an answer in computer-readable code. The agent may copy and paste the code into a dialogue box and press 'enter.' When that is complete, the code may execute and perform an action, such as automatically transferring the chat back to the chatbot with additional information so that the chatbot may answer the input. For example, the search request may simply re-frame the input in a manner so that the chatbot can understand, i.e., the agent may act as a translator between the chatbot and the user.

In an embodiment, the action may include converting the computer-readable code into a format accessible to the user, such as text, a hyperlink, an audiovisual message, or other accessible format.

In an embodiment, the answer provided by the program to the agent's search request may be determined by the contents of the search request and the past history of the chat.

In an embodiment, the input, search request, answer, and response may be stored by the program, in a database or other non-transitory memory. The input, search request, answer, and response may also be analyzed, through one or more algorithms (AI/ML or other) to train the chatbot for one or more future inputs. For example, the next time a user inputs the same or similar user input, the chatbot may understand and be able to respond, so no deflection to an agent would be necessary.

In an embodiment, the deflection of the chat to and from the agent may be seamless and invisible to a user. The user may not know that an agent viewed the chat to assist the chatbot (the only visible sign may be the chatbot taking longer to respond).

An apparatus for automatic chatbot deflection is provided. The apparatus may include a central server and an agent device near an agent (such as a personal computing device, server, smart mobile device, or other computing device).

The central server may include a server communication link, a server processor, and a server non-transitory memory, as well as other computing components. The server memory may be configured to store at least: a server operating system, and a chatbot. The chatbot may include an automatic chatbot deflection module. The automatic chatbot deflection module may be a distinct application from the chatbot, with access to the chatbot.

The agent device may include a device communication link, a device processor, a device graphical user interface, and a device non-transitory memory. The device memory may be configured to store at least: a device operating system, and an interface in electronic communication over the device communication link with the chatbot. The interface may be a distinct program or may be a part of a larger program. The interface may be a module of a chatbot deflection program. The interface may be a module of a chatbot program.

The automatic chatbot deflection module may receive an input from a user within a chat with the chatbot. The input may be a question or request.

The module may analyze the user input and determine, through an artificial intelligence/machine learning algorithm, that the input should be deflected/forwarded to the agent to provide an answer, as the chatbot may be unable to provide an answer. The module may analyze the past history of the user, the past history of the chat, the context of the input, and other information, when determining if the chatbot knows how to respond to the input or not.

The module may transfer the chat to the device graphical user interface, display the input to the agent, and provide a separate search field to the agent. Other information may also be displayed to the agent. Transferring the chat may include transferring control of the chat, allowing the agent to respond directly to the user.

The module may receive a search request from the agent within the search field, determine an answer to the search request, and provide, to the agent, the answer to the search request. The search request may be the agent's interpretation of the user input. The search request may hint at the correct interpretation of the user input, so that the chatbot may now understand the user input. The answer may be in computer-readable code, plain text, a hyperlink, or any other appropriate type.

The module may receive a response within a text field, from the agent to the input, transmit the response to the user, and transfer the chat back to the chatbot.

In an embodiment, the apparatus, when determining whether to transfer the chat to the agent, the chatbot deflection module may analyze, at least, the past history of the user, past history of the chat, the input, and the context of the input, as well as other available information. When, after analysis, the chatbot is unable to understand the user input to a pre-determined threshold level of certainty (e.g., the user input has a 51%, or 75%, or 90% etc., probability that it means XYZ), the apparatus may decide to deflect the chat to the agent.

In an embodiment, all or part of the chatbot deflection module may be graphically displayed on the interface. The interface may include various fields, one or more of which may include information from the chatbot deflection module.

In an embodiment, the chatbot deflection module may store the input, search request, answer, and response in a database (non-transitory memory) at the central server. The stored information may be used to train the chatbot, so that when a future user input similar to the user input is received, the chatbot may be able to understand and respond.

A method for automatically deflecting a chatbot to an agent is provided. The method may include the step of receiving an input from a user within a chat with a chatbot located at a central server. The input may be textual or audiovisual. Audiovisual input (s) may be processed through one or more natural language processing ("NLP") algorithms to convert the input (s) to text or machine-readable formats.

The method may include the step of determining, at a chatbot deflection module located at the central server, through an artificial intelligence/machine learning algorithm, that the input should be forwarded to the agent to provide an answer to the input, as the chatbot may be unable to answer the input satisfactorily. When the chatbot is unable to respond to the input with a pre-determined threshold level of certainty, the chat may be deflected to the agent for a response and then returned to the chatbot.

The method may include the step of transferring the chat to a device graphical user interface ("dGUI") near the agent. The dGUI may include at least three distinct fields: a chat history field, a search field, and a text response field. Additional fields, such as authentication, a browser, email, phone connectivity, etc. may be added.

The method may include the steps of displaying the input to the agent in the chat history field, displaying a chat history to the agent in the chat history field, and receiving a search request from the agent within the search field.

The method may include the steps of determining, at the chat deflection module, an answer to the search request, and providing, to the agent, the answer to the search request in the search field.

The method may include the steps of receiving a response within the text response field, from the agent, to the input, transmitting the response to the user, and transferring the chat back to the chatbot. When the chat is audiovisual-based, the method may include transforming the text response to an audio-visual response.

In an embodiment, when the chat is audio-visual, the agent may be connected through a phone or camera to the user to provide the agent's response directly.

In an embodiment, the method may include the step of storing, in a database at the central server, the input, the chat history, the search request, the answer, the response, metadata, and other information. The method may include the step of training the chatbot with data stored in the database. Training the chatbot may include instructing the chatbot how to answer future similar input (s) without the necessity of deflecting the chat to an agent.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein, or a human/entity.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an automatic chatbot deflection application and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application (s) 119 (such as an automatic chatbot deflection application and security protocols) along with any other data 111 (historical bot data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application (s) (such as an automatic chatbot deflection application and security protocols) along with any data needed for the operation of the apparatus and to allow chatbot deflection in both directions. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic chatbot deflection application and security protocols, as well as other programs. In an embodiment, one or more programs, or aspects of a program, may use one or more AI/ML algorithm (s). The various tasks may be related to automatically deflecting chats between a user and a chatbot from the chatbot to an agent and back to the chatbot.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application, such as an automatic chatbot deflection application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
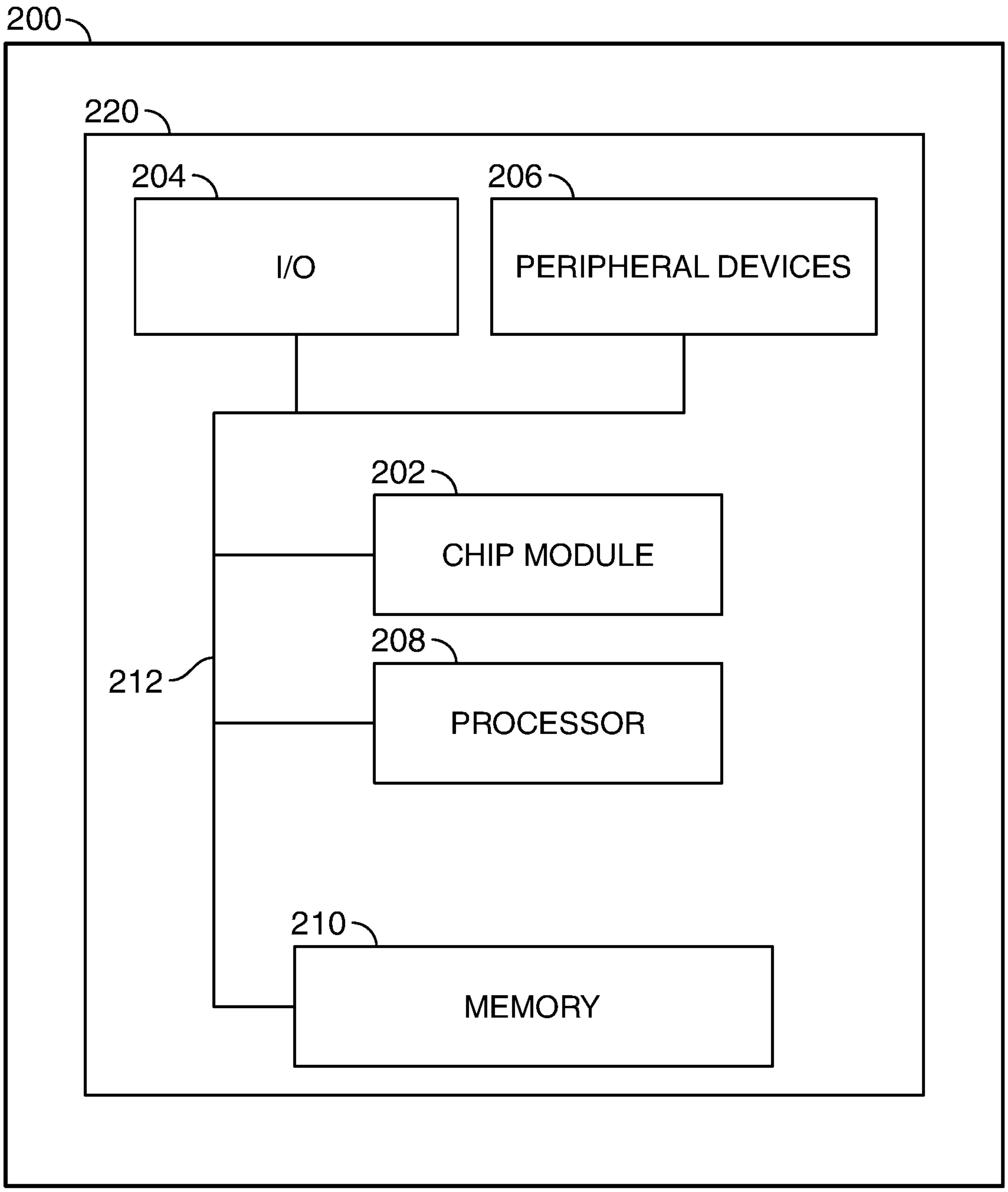
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
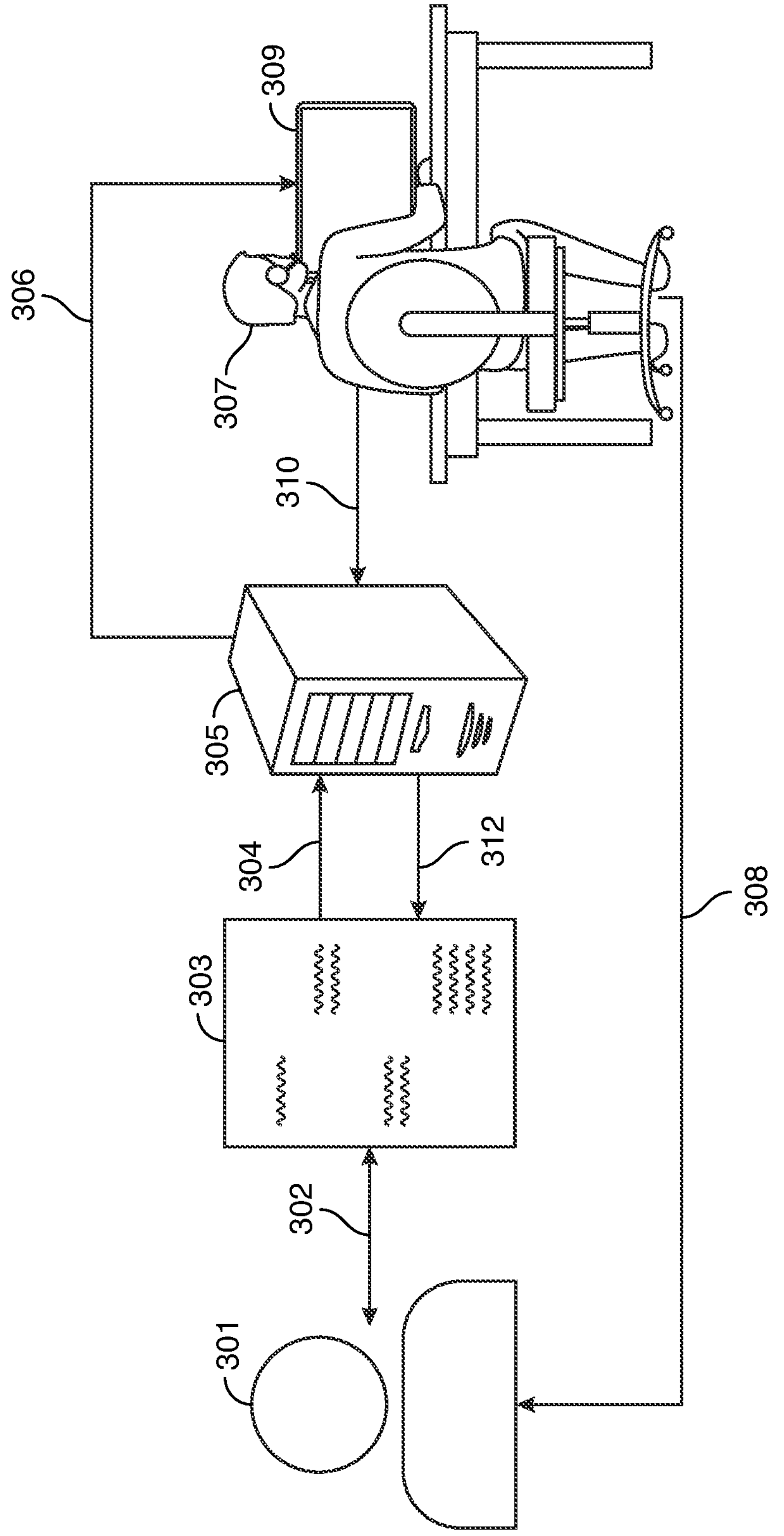
FIG. 3 shows an illustrative schematic in accordance with principles of the disclosure.

FIG. 3 shows an illustrative schematic in accordance with principles of the disclosure. Apparatus may include any of the apparatus odd-numbered 301 through 309, among other components. Methods may include some or all of the method steps even-numbered 302 through 312, as well as additional steps. Methods may include the steps illustrated in FIG. 3 in an order different from the illustrated order. The illustrative method shown in FIG. 3 may include one or more steps performed in other figures or described herein. Steps 302 through 312 may be performed on the apparatus shown in FIGS. 1-2, 4 and 6 or other apparatus shown in other figures or described elsewhere.

A user 301 may be conversing, textually or audio visually, with a chatbot 303 at step 302.

At step 304, the chatbot 303 may transfer the chat to a central server 305 to determine if the chatbot is able to answer an input by the user 301. Chatbot 303 may be located at central server 305. Chatbot 303 may be located remotely from central server 305. The central server 305 may include a chatbot deflection application or module (not shown) to analyze the input and deflect the chat to and from an agent and chatbot.

At step 306, when the chatbot deflection application determines that the chatbot 303 cannot answer the input, the central server 305 may transfer the input to a computer device 309 near an agent 307. The agent's computer device 309 may include a graphical user interface whereby the agent may examine the input and determine a response to the input.

At step 308, the agent 307 may respond to the user 301 directly through a chat interface. Alternatively, at step 310, the agent 307 may formulate a response to the input and transmit the response to the central server 305 for transmission to the chatbot 303 at step 312. In this embodiment, the user 301 may be unaware that an agent 307 responded to the user 301's input.

Figure 4:
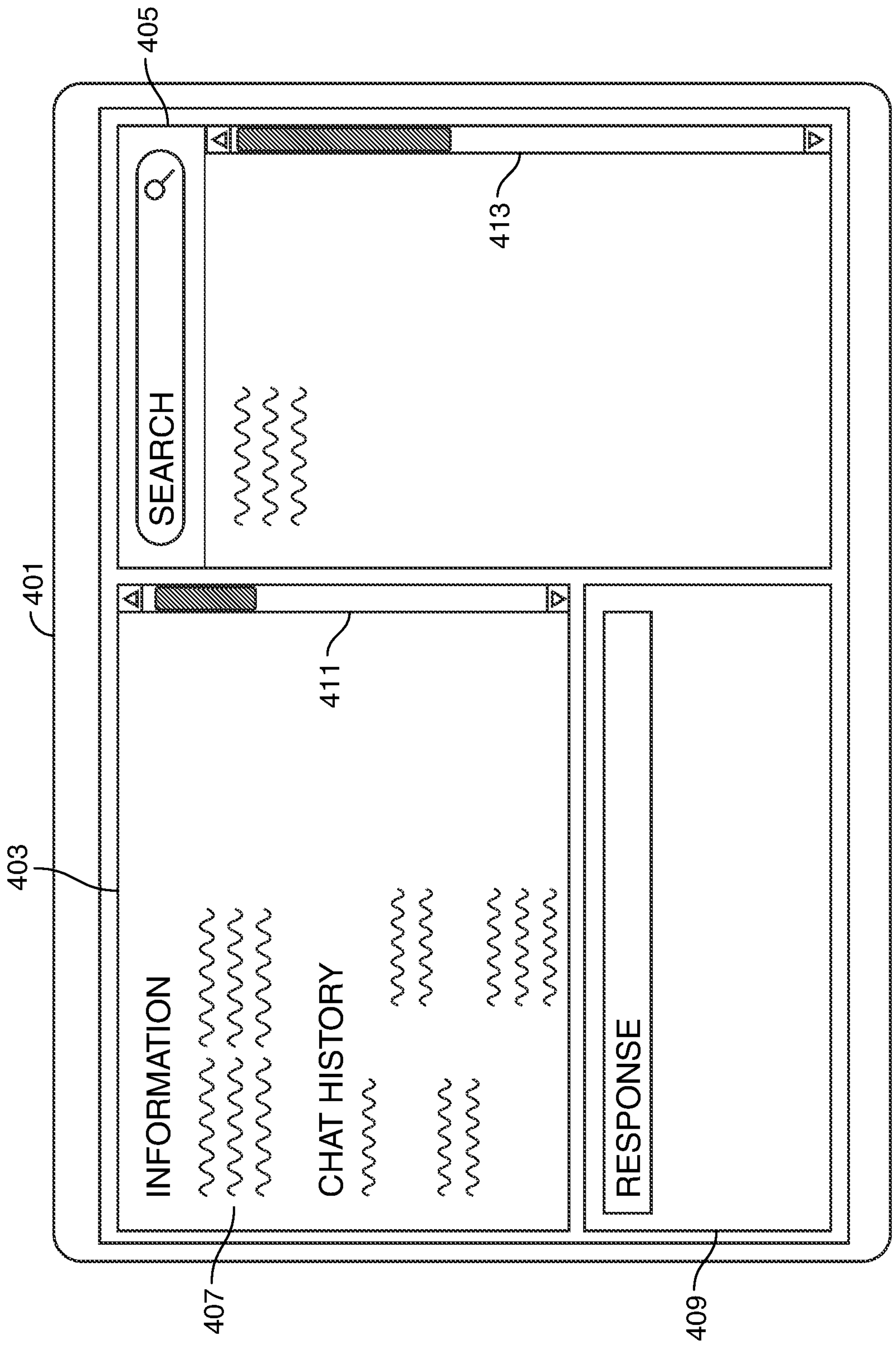
FIG. 4 shows an exemplary display screen in accordance with principles of the disclosure.

FIG. 4 shows an exemplary graphical user interface display screen in accordance with principles of the disclosure.

An agent device 401 may include a graphical display screen 403. The display screen 403 may be touch sensitive.

The display screen 403 may include multiple fields in various configurations. Search field 405 may include a search bar as well as results. Search field 405 may also include a scroll bar 413 to allow an agent to review multiple results.

History field 407 may include various information about a user conversing with a chatbot (not shown), including information about the user, chat history of the chat at issue, and past history of the user. Scroll bar 411 may allow an agent to view more information that does not fit within the history field 407.

Response field 409 may include an area for an agent (not shown) to enter (type, speak, copy/paste, etc.) a response to a user's chat input.

Fields 405, 407, and 409 may be configurable by a user (an agent) or set by an administrator. All fields may be interactive, allowing a user to copy/paste, enter, view, or otherwise manipulate data within a field.

Figure 5:
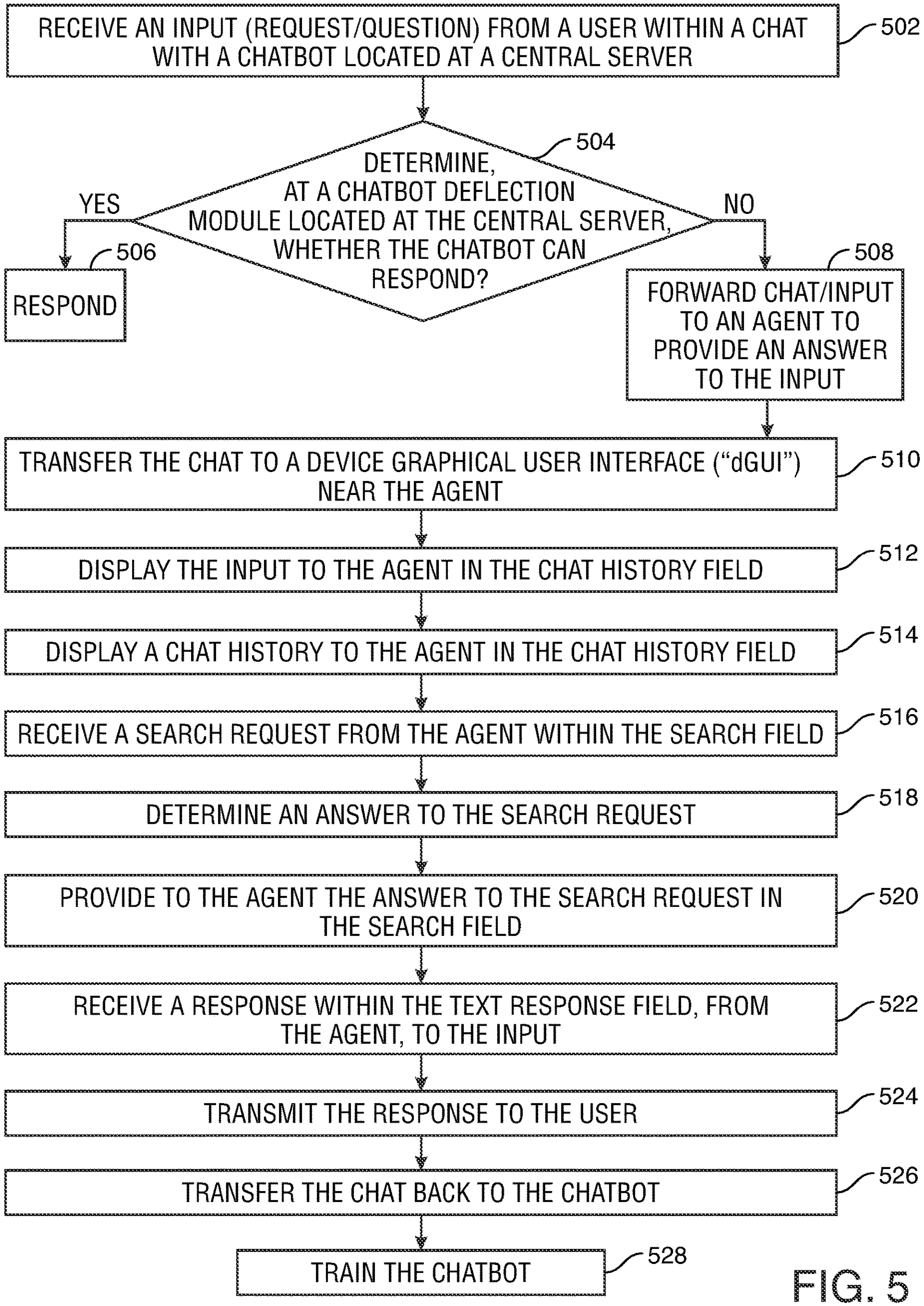
FIG. 5 shows an illustrative flowchart in accordance with principles of the disclosure.

FIG. 5 shows an illustrative flowchart in accordance with principles of the disclosure. Methods may include some or all of the method steps numbered 502 through 528. Methods may include the steps illustrated in FIG. 5 in an order different from the illustrated order. The illustrative method shown in FIG. 5 may include one or more steps performed in other figures or described herein. Steps 502 through 528 may be performed on the apparatus shown in FIGS. 1-4, 6 or other apparatus.

At step 502, an automatic chat deflection program on a centralized server may receive an input (request/question) from a user within a chat with a chatbot.

At step 504, the program may determine whether the chatbot is capable of answering/responding to the input or not. If the chatbot can respond, the chatbot may respond at step 506.

If the chatbot is not capable of responding to a threshold level of accuracy, at step 508, the program may forward the chat or input to an agent for the agent to provide an answer to the input.

In order to deflect the chat from the chatbot to the agent, at step 510, the program may transfer the chat/input to a device graphical user interface ("dGUI") located near the agent. The dGUI may be a computer screen on a computer near the agent.

At step 512, the program may display the input and other information to the agent in a chat history field of the dGUI. At step 514, the program may display the entire chat history and other information to the agent in a chat history field of the dGUI.

At step 516, the program may receive a search request from the agent in a search field. At step 518, the program may determine an answer to the search request, and at step 520, the program may provide the answer to the agent by displaying it within the search field.

At step 522, the program may receive a response, from the agent, to the user input. The agent may provide the response in a text response field. In an embodiment, the response may be audiovisual. In an embodiment, the response may be in machine-readable code.

At step 524, the program may transmit the response to the user.

At step 526, the program may transfer/deflect the chat back to the control of the chatbot instead of the agent.

At step 528, the program may use the information gathered in steps 502, and 516-524 to train the chatbot to respond to future user inputs that are similar to the input received at step 502.

Figure 6:
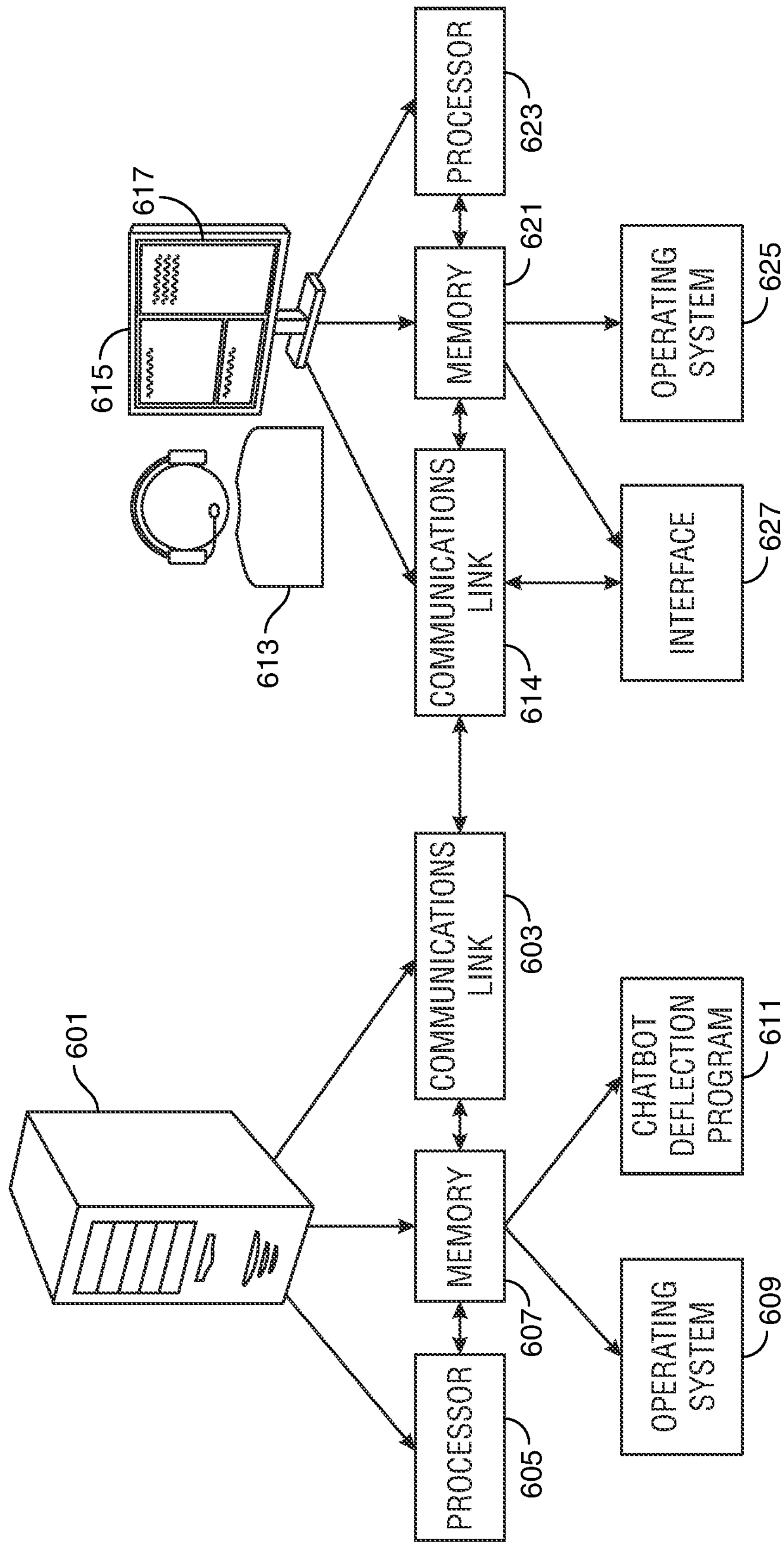
FIG. 6 shows an illustrative apparatus in accordance with principles of the disclosure.

FIG. 6 shows an illustrative apparatus in accordance with principles of the disclosure. A server/computer 601 may include a server communication link 603, a server processor/processors 605, and a serve non-transitory memory 607, as well as other components.

The non-transitory memory 607 may include an operating system 609, and an automatic chatbot deflection program 611, as well as other data and programs.

An agent 613 may be located near an agent computing device 615. The agent computing device 615 may include a display 617 with a graphical user interface.

Agent device 615 may include a device communications link 619, device non-transitory memory 621, and device processor (s) 623.

Device memory 621 may include a device operating system 625, as well as an interface 627 in electronic communication over the device communication link 619 and server communications link 603 with the chatbot deflection program 611.

Thus, apparatus and methods for automatic chatbot deflection (forwards and backwards) are provided. Persons skilled in the art will appreciate that the present invention can be practiced by other than the described embodiments, which are presented for purposes of illustration rather than of limitation.

What is claimed is:

1. An automatic chatbot deflection computer program product, the computer program product comprising executable instructions, the executable instructions when executed by a processor on a computer system:

receive an input from a user within a chat with a chatbot;
determine, through only an artificial intelligence algorithm, that the input be forwarded to a human agent to provide an answer when the chatbot is unable to answer the input to a threshold degree of confidence;
transfer the chat to a display proximate to the agent;
display the input to the agent;
provide a separate search display to the agent;
receive a search request from the agent within the search display;
determine an answer to the search request;
provide, to the agent, the answer to the search request;
receive a response, from the agent, to the input;
transmit the response to the user; and
transfer the chat back to the chatbot;

wherein:

the determination that the input be forwarded to the human agent to provide an answer analyzes, at least:
the input;
past history of the user interacting with the chatbot; and
context of the input; and
the search request relates to the input; and the user is unaware that the agent viewed the chat to assist the chatbot.

2. The automatic chatbot deflection computer program product of claim 1 wherein the answer is in computer-readable code.

3. The automatic chatbot deflection computer program product of claim 2 wherein the response comprises the agent copying and pasting the computer-readable code, and the computer-readable code is translated to plain-text.

4. The automatic chatbot deflection computer program product of claim 2 wherein the computer-readable code executes an action after the agent pastes the computer-readable code into a dialogue box.

5. The automatic chatbot deflection computer program product of claim 4 wherein the action comprises transferring the chat back to the chatbot.

6. The automatic chatbot deflection computer program product of claim 4 wherein the action comprises converting the computer-readable code into a format accessible to the user.

7. The automatic chatbot deflection computer program product of claim 1 wherein the response comprises the agent copying and pasting the answer to the search request.

8. The automatic chatbot deflection computer program product of claim 1 wherein the chat is text-based.

9. The automatic chatbot deflection computer program product of claim 1 wherein the chat is voice-based.

10. The automatic chatbot deflection computer program product of claim 1 wherein past history of the user is transferred to the display.

11. The automatic chatbot deflection computer program product of claim 1 wherein past history of the chat is transferred to the display.

12. The automatic chatbot deflection computer program product of claim 1 wherein the answer is determined by the search request and the past history of the user interacting with the chatbot.

13. The automatic chatbot deflection computer program product of claim 1 wherein the input, search request, answer, and response are:

stored by the program; and analyzed, through one or more algorithms, to train the chatbot for one or more future inputs.

14. An apparatus for automatic chatbot deflection, the apparatus comprising:

a central server, the central server including:

a server communication link;

a server processor; and a server non-transitory memory configured to store at least:

a server operating system; and a chatbot including an automatic chatbot deflection module; and an agent device proximate to a human agent, the agent device including:

a device communication link;

a device processor;

a device graphical user interface; and a device non-transitory memory configured to store at least:

a device operating system; and an interface in electronic communication over the device communication link with the chatbot;

wherein the automatic chatbot deflection module:

receives an input from a user within a chat with the chatbot;

determines, through only an artificial intelligence algorithm, that the input be forwarded to the agent to provide an answer when the chatbot is unable to answer the input to a threshold degree of confidence;

transfers the chat to the device graphical user interface;

displays the input to the agent;

provides a separate search field to the agent;

receives a search request from the agent within the search field;

determines an answer to the search request;

provides, to the agent, the answer to the search request;

receives a response within a text field, from the agent, to the input;

transmits the response to the user; and transfers the chat back to the chatbot; and wherein the user is unaware that the agent viewed the chat to assist the chatbot.

15. The apparatus of claim 14 wherein, to determine when to transfer the chat to the agent, the chatbot deflection module analyzes, at least:

past history of the user interacting with an entity;

past history of the user interacting with the chatbot;

the input; and context of the input.

16. The apparatus of claim 14 wherein the chatbot deflection module is graphically displayed on the interface.

17. The apparatus of claim 14 wherein the chatbot deflection module further stores the input, search request, answer, and response in a database at the central server.

18. A method for automatically deflecting a chatbot to a human agent, the method comprising:

receiving an input from a user within a chat with a chatbot located at a central server;

determining, at a chatbot deflection module located at the central server, through only an artificial intelligence algorithm, that the input be forwarded to the agent to provide an answer to the input;

transferring the chat to a device graphical user interface ("dGUI") proximate to the agent, wherein the dGUI comprises at least three distinct fields:

a chat history field;

a search field; and a text response field;

displaying the input to the agent in the chat history field;

displaying a history of the chat to the agent in the chat history field;

receiving a search request from the agent within the search field;

determining an answer to the search request;

providing, to the agent, the answer to the search request in the search field;

receiving a response within the text response field, from the agent, to the input;

transmitting the response to the user; and transferring the chat back to the chatbot;

wherein the user is unaware that the agent viewed the chat to assist the chatbot.

19. The method of claim 18 further comprising:

storing, in a database:

the input;

the history of the chat;

the search request;

the answer;

the response; and metadata.

20. The method of claim 19 further comprising training the chatbot with data stored in the database.

* * * * *